W. H. CARPENTER.
PROCESS OF TREATING AND UTILIZING SULLAGE FROM MOLTEN METALS.
APPLICATION FILED NOV. 19, 1908.
913,874.
Patented Mar. 2, 1909.
Witnesses.
Inventor.
William H. Carpenter.
By James Shepard.
Atty.

UNITED STATES PATENT OFFICE.

WILLIAM H. CARPENTER, OF BRISTOL, CONNECTICUT, ASSIGNOR OF ONE-HALF TO A. L. HAASIS, OF BROOKLYN, NEW YORK.

PROCESS OF TREATING AND UTILIZING SULLAGE FROM MOLTEN METALS.

No. 913,874.      Specification of Letters Patent.      Patented March 2, 1909.

Application filed November 19, 1908. Serial No. 463,487.

*To all whom it may concern:*

Be it known that I, WILLIAM H. CARPENTER, a citizen of the United States, residing at Bristol, in the county of Hartford and State of Connecticut, have invented a new and useful Improvement in the Process of Treating and Utilizing Sullage from Molten Metals, of which the following is a specification.

This invention relates to the process of treating and utilizing the sullage that is skimmed from molten metals and has for its object to render the process expeditious and to save labor and material.

Ordinarily the sullage that is skimmed from molten metal is deposited in a pile where it is allowed to remain until the combustible material therein is consumed and the mass becomes cool. It is then crushed or stamped and washed to separate the dirt and refuse from the metal. The sullage contains a part of the charcoal that has been used for flux and this of course is consumed and wasted. The metal that remains in the sullage runs into the dirt and refuse so as to stick it together making it necessary to crush the mass in order to separate the metal from the dirt. In thus crushing the sullage the metal is also crushed more or less thereby making it finer and more likely to be lost in washing. Instead of thus depositing the skimmed sullage when hot, in a pile, I skim the hot sullage directly into a tank of water, thereby immediately extinguishing the fire in the charcoal or other combustible material, and separating the metal from the dirt by suddenly cooling the metal. This has a tendency to deposit the metal in pieces of a compact form, more or less globular, instead of the filamentous form that the metal has when it is allowed to run and spread out for a time before cooling.

In the accompanying drawing, I have shown an operator in the act of skimming a crucible of molten metal into water in accordance with my process. The tank 2 is filled with water nearly to the top, and is preferably sunk in the ground floor of the foundry so that a considerable body of water may be used and at the same time the top of the tank may be at a convenient height for skimming the sullage from the crucible 3 directly into the water in the tank. The tank may be provided with a cover 4 so arranged as to leave an opening 5 for the sullage to pass through as the operator pokes it with the skimmer 6 from the crucible into the tank of water. After thus depositing the sullage in the water tank, the floating pieces of charcoal may be skimmed off and allowed to drain, after which the charcoal may be used for flux in the ordinary manner. The heavier material which settles to the bottom of the tank is removed therefrom, then washed and screened to separate the dirt from the metal. This washing and screening is done without crushing the mass, the sudden cooling in water rendering the crushing operation unnecessary. Some of the finer particles of charcoal or other combustible material will cling to the metal but it is not necessary to remove them as the metal thus extracted from the sullage may be placed in the crucible for remelting and any particles of charcoal therein will serve as flux, and thus be beneficial instead of harmful. The metal saved from the sullage can be used in a short time after the crucible is skimmed, thereby preventing the accumulation of large quantities of waste or scrap metal. The sullage, by my process, is gotten out of the way at once, and there is no inconvenience to the workman due to a hot pile on the foundry floor as there is by the old process. My process effects a saving in time and labor, a saving in charcoal, and a saving in metal.

What I claim as my invention and desire to secure by Letters Patent, is—

1. In a process of treating and utilizing sullage from crucibles containing molten metal, the process of treating the sullage consisting of skimming it from the crucible and depositing it when hot therefrom directly into a body of water for cooling and separation.

2. The herein described process of treating and utilizing sullage that floats on molten metal in crucibles, consisting of skimming it from the crucible when hot therefrom and depositing it when hot therefrom directly into a body of water for cooling and separation, then washing and screening the sediment to extract the metal, together with such combustible material as may be mixed therewith.

3. The process of treating and utilizing sullage from crucibles containing molten metal, consisting of depositing the sullage when hot from the crucible directly into a body of water for cooling and separation, then removing the combustible material that may be floating on the water, and then removing the sediment for washing and screening to extract, for reheating, the metal and such combustible material as may be mixed therewith.

WILLIAM H. CARPENTER.

Witnesses:
A. D. WILSON,
H. R. COOK.